(12) United States Patent
Noh et al.

(10) Patent No.: US 9,379,874 B2
(45) Date of Patent: Jun. 28, 2016

(54) CONTROLLING UPLINK POWER

(71) Applicant: KT CORPORATION, Gyeonggi-do (KR)

(72) Inventors: Min Seok Noh, Seoul (KR); Woo-Jin Choi, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 87 days.

(21) Appl. No.: 14/063,220

(22) Filed: Oct. 25, 2013

(65) Prior Publication Data

US 2014/0105141 A1    Apr. 17, 2014

Related U.S. Application Data

(62) Division of application No. 14/051,514, filed on Oct. 11, 2013.

(30) Foreign Application Priority Data

Oct. 12, 2012   (KR) .................. 10-2012-0113844
Feb. 27, 2013   (KR) .................. 10-2013-0021542

(51) Int. Cl.
| | |
|---|---|
| H04L 5/00 | (2006.01) |
| H04W 52/04 | (2009.01) |
| H04W 52/36 | (2009.01) |
| H04W 52/14 | (2009.01) |
| H04W 52/32 | (2009.01) |

(52) U.S. Cl.
CPC ............. *H04L 5/0058* (2013.01); *H04L 5/001* (2013.01); *H04L 5/0051* (2013.01); *H04W 52/04* (2013.01); *H04W 52/367* (2013.01); *H04W 52/146* (2013.01); *H04W 52/325* (2013.01)

(58) Field of Classification Search
None
See application file for complete search history.

(56) References Cited

U.S. PATENT DOCUMENTS

| | | | |
|---|---|---|---|
| 2012/0057547 A1 | 3/2012 | Loehr et al. | |
| 2013/0058315 A1 | 3/2013 | Feuersaenger et al. | |
| 2013/0114505 A1* | 5/2013 | Haim et al. | 370/328 |
| 2013/0188580 A1* | 7/2013 | Dinan | 370/329 |
| 2013/0272230 A1* | 10/2013 | Dinan | 370/329 |
| 2013/0272231 A1* | 10/2013 | Dinan | 370/329 |
| 2013/0272232 A1* | 10/2013 | Dinan | 370/329 |
| 2013/0272233 A1* | 10/2013 | Dinan | 370/329 |
| 2013/0279435 A1* | 10/2013 | Dinan | 370/329 |
| 2014/0161108 A1 | 6/2014 | Lohr et al. | |
| 2015/0031410 A1* | 1/2015 | Lim | H04W 52/146 455/522 |
| 2015/0189675 A1 | 7/2015 | Feuersaenger et al. | |

FOREIGN PATENT DOCUMENTS

WO    2011/120716 A1    10/2011

OTHER PUBLICATIONS

CATT,"SRS transmission with multiple timing advances in Rel-11", R1-123212, 3GPP TSG RAN WG1 Meeting #70, Qingdao, China, Aug. 13-17, 2012, pp. 1-3.

(Continued)

*Primary Examiner* — Christine Duong
(74) *Attorney, Agent, or Firm* — IP Legal Services, LLC

(57) ABSTRACT

The disclosure is related to multiplexing an uplink channel and an uplink reference signal transmitted on uplink, and controlling an uplink power, in user equipment in the case of carrier aggregation.

10 Claims, 11 Drawing Sheets

(56) References Cited

OTHER PUBLICATIONS

ZTE et al., "Way Forward on SRS Transmission with Multiple TA", R1-123985, 3GPP TSG RAN WG1 #70, Qingdao, China, Aug. 13-17, 2012, pp. 1-4.

ZTE, "Issues about SRS transmission in multiple TA", R1-123385, 3GPP TSG RAN WG1 Meeting #70, Qingdao, China, Aug. 13-17, 2012, pp. 1-3.

Panasonic et al., "Way forward on remaining issues on multiple TA", R1-123988, 3GPP TSG RAN WG1 Meeting #70, Qingdao, China, Aug. 13-17, 2012, pp. 1-7.

Qualcomm Incorporated, "Power control aspects of multiple TA operation", R1-123679, 3GPP TSG RAN WG1 #70, Qingdao, China, Aug. 13-17, 2012, pp. 1-4.

Pasupuleti, "Sounding Reference Signal Procedure", How LTE Stuff Works?, http://howltestuffworks.blogspot.com/2014/07/sounding-reference-signal-procedure.html, Jul. 17, 2014, pp. 1-6.

* cited by examiner

CONTROLLING UPLINK POWER

CROSS REFERENCE TO PRIOR APPLICATIONS

This application claims priority to and is a divisional of pending U.S. patent application Ser. No. 14/051,514, filed on Oct. 11, 2013, which claims priority under 35 U.S.C. §119 to Korean Patent Application No. 10-2012-0113844 (filed on Oct. 12, 2012) and Korean Patent Application No. 10-2013-0021542 (filed on Feb. 27, 2013), which are hereby incorporated by reference in their entirety.

BACKGROUND

The present disclosure relates to multiplexing an uplink channel and an uplink reference signal transmitted on uplink, and controlling an uplink power, in user equipment in the case that carrier aggregation is applied.

Carrier aggregation (CA) is transmission and reception of signals through two or more component carriers. In carrier aggregation, user equipment may simultaneously transmit an uplink channel (e.g., an uplink data channel and/or an uplink control channel) and an uplink signal to a transmission/reception point. In this case, typically, a single transmission timing advance (TA) value for the user equipment is identically applied to all different component carriers or all different serving cells. Herein, the transmission TA value is indicated by the transmission/reception point.

However, in the case that multiple transmission TA values are indicated for the user equipment, multiplexing and/or power control methods between an uplink channel and an uplink signal on different component carriers (or serving cells) or component carrier groups (or serving cell groups) might be required to be different from multiplexing and/or power control methods in the case of a single TA.

SUMMARY

In accordance with at least one embodiment, a method may be provided for controlling an uplink power in user equipment. The method may include configuring multiple timing advance groups (TAGs); and performing a resource mapping for a simultaneous transmission of a sounding reference signal (SRS) and a physical uplink shared channel (PUSCH) on a same cell. Herein, the resource mapping may be performed such that a last symbol of a subframe transmitting the PUSCH is not mapped to a resource element for the PUSCH.

In accordance with another embodiment, a method may be provided for controlling an uplink power in user equipment. The method may include configuring multiple timing advance groups (TAGs); and controlling an SRS transmission in the case of a simultaneous transmission of a sounding reference signal (SRS) and at least one of a physical uplink shared channel (PUSCH) and a physical uplink control channel (PUCCH) on different cells. Herein, the controlling may include dropping the SRS if a total transmit power exceeds a maximum allowable transmit power ($P_{CMAX}$) of the user equipment on an overlapped portion between symbols transmitting the SRS and symbols transmitting the at least one of the PUSCH and PUCCH on the different cells.

In accordance with still another embodiment, a method may be provided for controlling an uplink power in user equipment. The method may include configuring multiple timing advance groups (TAGs); and determining a sounding reference signal (SRS) transmit power in a case of a simultaneous transmission of a plurality of SRSs on different cells. Herein, the determining may include determining a transmit power of each SRS by performing an identical scaling if a total transmit power exceeds a maximum allowable transmit power of the user equipment on an overlapped portion between symbols transmitting the plurality of SRS.

In accordance with still another embodiment, user equipment may be provided. The user equipment may include a receiver and a control processor. The receiver may be configured to receive configuration information associated with multiple timing advance groups (TAGs). The control processor may be configured (i) to configure the multiple TAGs, and (ii) to perform a resource mapping for a simultaneous transmission of a sounding reference signal (SRS) and a physical uplink shared channel (PUSCH) on a same cell. Herein, the resource mapping may be performed such that a last symbol of a subframe transmitting the PUSCH is not mapped to a resource element for the PUSCH.

In accordance with still another embodiment, user equipment may be provided. The user equipment may include a receiver and a control processor. The receiver may be configured to receive configuration information associated with multiple timing advance groups (TAGs). The control processor may be configured (i) to configure the multiple TAGs, and (ii) to control an SRS transmission in the case of a simultaneous transmission of a sounding reference signal (SRS) and at least one of a physical uplink shared channel (PUSCH) and physical uplink control channel (PUCCH) on different cells. Herein, the control processor may be configured to drop the SRS if a total transmit power exceeds a maximum allowable transmit power ($P_{CMAX}$) of the user equipment on an overlapped portion between symbols transmitting the SRS and symbols transmitting the at least one of the PUSCH and PUCCH on the different cells.

In accordance with still another embodiment, user equipment may be provided. The user equipment may include a receiver and a control processor. The receiver may be configured to receive configuration information associated with multiple timing advance groups (TAGs). The control processor may be configured (i) to configure the multiple TAGs, and (ii) to determine a sounding reference signal (SRS) transmit power in a case of a simultaneous transmission of a plurality of SRS on different cells. Herein, a transmit power of each SRS may be determined by performing an identical scaling if a total transmit power exceeds a maximum allowable transmit power of the user equipment on an overlapped portion between symbols transmitting the plurality of SRS.

BRIEF DESCRIPTION OF THE DRAWINGS

FIG. 2 is a diagram illustrating a simultaneous transmission of HARQ ACK/NACK and a CSI using PUCCH format 2 in accordance with at least one embodiment;

DETAILED DESCRIPTION OF EMBODIMENTS

Figure 1:
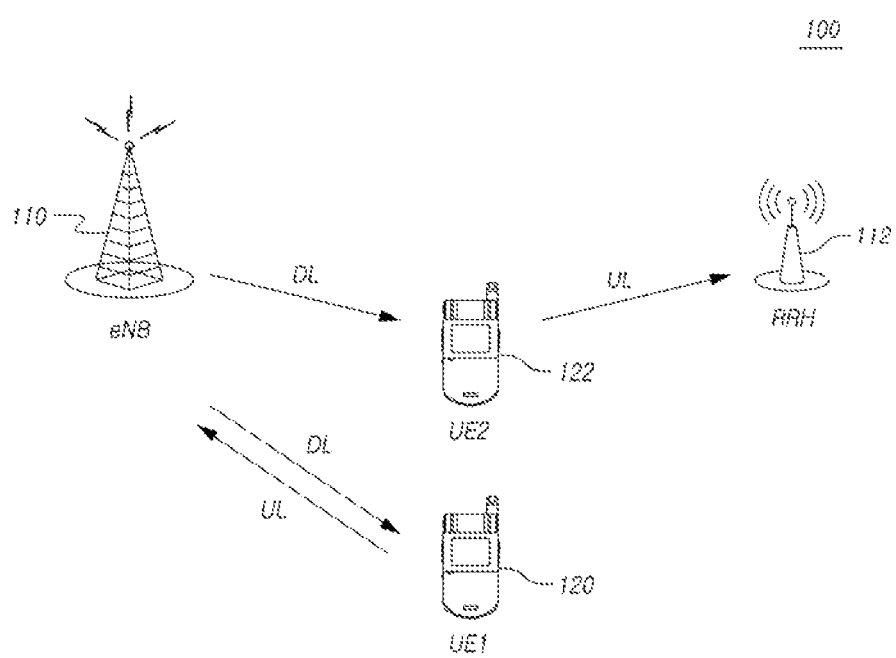
FIG. 1 is an exemplary diagram illustrating a wireless communication system to which at least one embodiment may be applied.

Hereinafter, exemplary embodiments of the present invention will be described with reference to the accompanying drawings. In the following description, the same elements will be designated by the same reference numerals although they are shown in different drawings. Furthermore, in the following description of the present embodiment, a detailed description of known functions and configurations incorporated herein will be omitted when it may make the subject matter of the present embodiment unclear.

A wireless communication system in accordance with at least one embodiment may be widely used in order to provide a variety of communication services such as a voice service, a packet data service, and so forth. The wireless communication system may include user equipment (UE) and at least one transmission/reception point. In the present description, the term "user equipment (UE)" is used as a general concept that includes a terminal in wireless communication. Accordingly, the user equipment (UE) should be construed as a concept that includes a mobile station (MS), a user terminal (UT), a subscriber station (SS), and/or a wireless device in a global system for mobile communications (GSM), as well as user equipment used in wideband code division multiple access (WCDMA), long term evolution (LTE), and/or high speed packet access (HSPA).

The transmission/reception point may indicate a station that communicates with the user equipment. Such a transmission/reception point may be referred to with different terms, for example, a base station (BS), a cell, a Node-B, an evolved Node-B (eNB), a sector, a site, a base transceiver system (BTS), an access point (AP), a relay node (RN), a remote radio head (RRH), a radio unit (RU), an antenna, and the like.

That is, in the present description, the transmission/reception point, the base station (BS) or the cell may be construed as an inclusive concept indicating a portion of an area or a function covered by a base station controller (BSC) in code division multiple access (CDMA), a Node-B in WCDMA, an eNB or a sector (a site) in LTE, and the like. Accordingly, a concept of the transmission/reception point, the base station (BS), and/or the cell may include a variety of coverage areas such as a megacell, a macrocell, a microcell, a picocell, a femtocell, and the like. Furthermore, such concept may include a communication range of the relay node (RN), the remote radio head (RRH), or the radio unit (RU).

In the present description, the user equipment and the transmission/reception point may be two transmission/reception subjects, having an inclusive meaning, which are used to embody the technology and the technical concept disclosed herein, and may not be limited to a specific term or word. Furthermore, the user equipment and the transmission/reception point may be uplink or downlink transmission/reception subjects, having an inclusive meaning, which are used to embody the technology and the technical concept disclosed in connection with the present embodiment, and may not be limited to a specific term or word. Herein, an uplink (UL) transmission/reception is a scheme in which data is transmitted from user equipment to a base station. Alternatively, a downlink (DL) transmission/reception is a scheme in which data is transmitted from the base station to the user equipment.

The wireless communication system may use a variety of multiple access schemes such as CDMA, time division multiple access (TDMA), frequency division multiple access (FDMA), orthogonal frequency division multiple access (OFDMA), OFDM-FDMA, OFDM-TDMA, OFDM-CDMA, and/or the like. Such multiple access schemes, however, are not limited thereto. At least one embodiment may be applied to resource allocation in the field of asynchronous wireless communications evolving to LTE and LTE-advanced (LTE-A) through GSM, WCDMA, and HSP, and in the field of synchronous wireless communications evolving into CDMA, CDMA-2000, and UMB. The present embodiment should not be construed as being limited to or restricted by a particular wireless communication field, and should be construed as including all technical fields to which the spirit of the present embodiment can be applied.

In the case of an uplink transmission and a downlink transmission, at least one of a time division duplex (TDD) and a frequency division duplex (FDD) may be used. Herein, the TDD may perform the uplink/downlink transmissions using different times. The FDD may perform the uplink/downlink transmissions using different frequencies.

In a LTE or LTE-A system in conformance with a corresponding standard, an uplink and/or a downlink may be formed based on one carrier or a pair of carriers. In the case of the uplink and/or downlink, control information may be transmitted through such control channels as a physical downlink control channel (PDCCH), a physical control format indicator channel (PCFICH), a physical hybrid ARQ indicator channel (PHICH), a physical uplink control channel (PUCCH), and/or so forth. Data may be transmitted through such data channels as a physical downlink shared channel (PDSCH), a physical uplink shared channel (PUSCH), and/or the like. In the present specification, PDCCH may be a concept including EPDCCH.

In the present description, the term "cell" may indicate one of coverage of a signal transmitted from a transmission point or transmission/reception point, a component carrier having the coverage, and the transmission/reception point. Herein, the term "transmission/reception point" may indicate one of a transmission point transmitting a signal, a reception point receiving a signal, and a combination thereof (i.e., a transmission/reception point).

In the present description, the term "HARQ ACK/NACK" is an abbreviation of "hybrid automatic repeat request (HARQ)-acknowledgment (ACK)/negative acknowledgement (NACK)," and may be referred to as a hybrid-ARQ acknowledgement, or a hybrid ACK/NACK signal. Channel state information (CSI) might refer to a channel state information report such as a rank indicator (RI), a precoding matrix indicator (PMI), and a channel quality indicator (CQI).

FIG. 1 is an exemplary diagram illustrating a wireless communication system to which at least one embodiment may be applied.

Referring to FIG. 1, wireless communication system 100 may be one of a coordinated multi-point transmission/reception (CoMP) system, a coordinated multi-antenna transmission system, and a coordinated multi-cell communication system. Herein, the CoMP system may transmit signals through cooperation between a plurality of transmission/reception points. Wireless communication system 100 such as a CoMP system may include a plurality of transmission/reception points 110 and 112, and at least one user equipment (UE) 120 and 122.

The transmission/reception points may be, as shown in the figure, one of a first transmission/reception point (e.g., eNB 110) and a second transmission/reception point (e.g., RRH 112). Herein, the first transmission/reception point (e.g., eNB 110) may be a base station or a macrocell (or macronode). The second transmission/reception point (e.g., RRH 112) may be at least one picocell which is wiredly controlled by coupling to the first transmission/reception point (e.g., eNB 110) through an optical cable or an optical fiber. Furthermore, the second transmission/reception point (e.g., RRH 112) may have either a high transmission power, or a low transmission power within a macrocell region. The first and second transmission/reception points (e.g., eNB 110 and RRH 112) may have the same cell identity (ID) or different cell identities.

Hereinafter, a downlink (DL) may represent communication or a communication path from transmission/reception points 110 and 112 to user equipment 120. An uplink (UL) may represent communication or a communication path from user equipment 120 to transmission/reception points 110 and 112. In the downlink, a transmitter may be a portion of transmission/reception points 110 and 112, and a receiver may be a portion of user equipment 120 and 122. In the uplink, a transmitter may be a portion of user equipment 120, and a receiver may be a portion of transmission/reception points 110 and 112.

Hereinafter, a situation in which a signal is transmitted or received through such channels as PUCCH, PUSCH, PDCCH, and/or PDSCH may be referred to by the expression "transmit or receive PUCCH, PUSCH, PDCCH, and/or PDSCH."

The first transmission/reception point (e.g., eNB 110) corresponding to one of transmission/reception points (e.g., 110 and 112) may perform a downlink transmission to user equipment 120 and 122. The first transmission/reception point (e.g., eNB 110) may transmit PDSCH corresponding to a primary physical channel, for unicast transmission. Furthermore, the first transmission/reception point (e.g., eNB 110) may transmit PDCCH in order to transmit downlink control information, such as scheduling information required for receiving PDSCH, and to transmit scheduling grant information for an uplink data channel (e.g., PUSCH) transmission. Hereinafter, "transmit or receive a signal through a channel" may be referred to as the expression of "transmit or receive a channel."

As described in FIG. 1, first user equipment (UE1) 120 may transmit an uplink signal to the first transmission/reception point (e.g., eNB 110). Second user equipment (UE2) 122 may transmit an uplink signal to the second transmission/reception point (e.g., RRH 112) of a plurality of transmission/reception points (e.g., 110 and 112). Alternatively, first user equipment 120 (UE1) may transmit an uplink signal to the second transmission/reception point (e.g., RRH 112), and second user equipment 122 may transmit an uplink signal to the first transmission/reception point (e.g., eNB 110). Unlike FIG. 1, two or more user equipments might be included in wireless communication system 100. However, for convenience of descriptions, wireless communication system 100 will be described as including two user equipments 120 and 122, one transmitting an uplink signal to the first transmission/reception point (e.g., eNB 110) and the other transmitting an uplink signal to the second transmission/reception point (e.g., RRH 112).

In this case, as described later, first user equipment (UE1) 120 may transmit an uplink signal to the first transmission/reception point (e.g., eNB 110), and second user equipment (UE2) 122 may transmit an uplink signal to the second transmission/reception point (e.g., RRH 112).

In a wireless communication system, when performing an uplink transmission, user equipment may transmit an uplink demodulation reference signal (UL DMRS or UL DM-RS) per slot such that channel information for demodulation of data channels is recognized. In case of an uplink DM-RS associated with PUSCH, user equipment may transmit a reference signal through one symbol per slot. In case of an uplink DM-RS associated with PUCCH, user equipment may transmit reference signals through a different number of symbols according to PUCCH formats. For example, in case of PUCCH formats 1/1a/1b (i.e., PUCCH format 1, PUCCH format 1a, and the PUCCH format 1b), a reference signal may be transmitted through three symbols per slot. In a case of PUCCH formats 2/2a/2b/3 (i.e., PUCCH format 2, PUCCH format 2a, and PUCCH format 2b, and PUCCH format 3), a reference signal may be transmitted through two symbols per slot.

The PUCCH is used as an uplink control channel and is associated with a format classified according to a type of information transmitted from user equipment. Table 1 below shows PUCCH formats.

TABLE 1

| PUCCH format | Modulation scheme | Number of bits per subframe ($M_{bit}$) |
|---|---|---|
| 1 | N/A | N/A |
| 1a | BPSK | 1 |
| 1b | QPSK | 2 |
| 2 | QPSK | 20 |
| 2a | QPSK + BPSK | 21 |
| 2b | QPSK + QPSK | 22 |
| 3 | QPSK | 48 |

The PUCCH formats 1/1a/1b (i.e., the PUCCH format 1, the PUCCH format 1a, and the PUCCH format 1b) may be used for transmitting a scheduling request (SR) and HARQ-ACK. The PUCCH formats 2/2a/2b (i.e., the PUCCH format 2, the PUCCH format 2a, and the PUCCH format 2b) may be used for transmitting a channel quality indicator (CQI), a precoding matrix indicator (PMI), and a rank indicator (RI). The PUCCH format 3 may be used for transmitting multiple HARQ ACK/NACKs.

Hereinafter, each PUCCH format and usages thereof will be described in more detail.

The PUCCH format 1 is a channel format for transmitting only a scheduling request (SR). The PUCCH formats 1a/1b (i.e., the PUCCH format 1a and the PUCCH format 1b) are channel formats for transmitting a scheduling request (SR) and/or ACK/NACK for a downlink data channel. Herein, the PUCCH formats 1a/1b may be classified according to the number of bits of ACK/NACK and a corresponding modulation scheme. Meanwhile, in the case of the PUCCH formats 1a/1b associated with an ACK/NACK transmission, the last SC-FDMA symbol of a subframe may be punctured. In this case, PUCCH format 1a with the punctured SC-FDMA symbol may be referred to as "shortened PUCCH format 1a." Similarly, PUCCH format 1b with the punctured SC-FDMA symbol may be referred to as "shortened PUCCH format 1b." One of the PUCCH formats 1/1a/1b may be selected and used based on a value (e.g., "TRUE" or "FALSE") of an RRC parameter (e.g., "ackNackSRS-SimultaneousTransmission") and cell-specific information of a sounding reference symbol (SRS), provided by an associated higher layer of a transmission/reception point.

The PUCCH format 2 is a channel format for transmitting only a channel quality indicator (CQI). Meanwhile, the PUCCH formats 2a/2b (i.e. the PUCCH format 2a and the PUCCH format 2b) are channel formats for transmitting 'the CQI' and 'ACK/NACK corresponding to a response to a downlink data channel.' The PUCCH formats 2a/2b may be classified according to the number of bits of ACK/NACK and a modulation scheme.

The PUCCH format 3 is a channel format for transmitting ACK/NACK having a length of more than four bits in downlink carrier aggregation. In the case of the PUCCH format 3 associated with an ACK/NACK transmission, the last SC-FDMA symbol of a subframe may be punctured. In this case, PUCCH format 3 with the punctured SC-FDMA symbol may be referred to as "shortened PUCCH format 3." In other words, the last SC-FDMA symbol of the shortened PUCCH format 3 is not mapped to resource elements. One of the PUCCH format 3 and the shortened PUCCH format 3 might be selected and used based on a value (e.g., "TRUE" or "FALSE") of a RRC parameter (e.g., "ackNackSRS-SimultaneousTransmission") and cell-specific information of an SRS, provided by an associated higher layer of a transmission/reception point.

Meanwhile, in an LTE communication system corresponding to wireless communication systems, a demodulation reference signal (DMRS or DM-RS) and an SRS may be defined for an uplink. Three types of reference signals (RSs) may be defined for a downlink. Herein, the three types of the reference signals (RSs) may include a cell-specific reference signal (CRS), a multicast/broadcast over single frequency network reference signal (MBSFN-RS), and a UE-specific reference signal.

An uplink sounding reference signal (SRS) might be used for measuring an uplink channel state for an uplink frequency-dependent scheduling. Such an uplink SRS might be also used for measuring uplink and downlink channel states in order for downlink beam-forming using channel reciprocity in a time division duplex (TDD) system. In the case of the uplink SRS, a certain transmission/reception point or a certain cell in wireless communication system 100 may transmit parameters for SRS generation (i.e., parameters for generation of the SRS transmitted by user equipment) to the user equipment. Herein, the parameters for SRS generation may include a cell-specific SRS bandwidth, a transmission comb, a UE-specific SRS bandwidth, hopping related configuration parameters, a frequency domain position, a periodicity, a subframe configuration (designating which subframe will transmit an SRS), an antenna configuration (designating the number of antennas transmitting an SRS and the number of antenna ports), a base sequence index, a cyclic shift index (i.e., a reference signal to be used for SRS generation), and so forth. Herein, transmission comb may designate frequency positions assigned at intervals of two types of subcarrier spacing. For example, "0" may denote even subcarriers and "1" may denote odd subcarriers. The base sequence index may be an SRS sequence index for generating a corresponding SRS. The SRS sequence index may be determined, based on sequence group number u used in PUCCH and base sequence number v defined according to a sequence hopping configuration. More specifically, a corresponding transmission/reception point (e.g., eNB 110) may transmit the parameters for SRS generation, as RRC parameters, to user equipment 120. User equipment 120 may receive the parameters for SRS generation from eNB 110, and transmit an uplink SRS to eNB 110.

Furthermore, an aperiodic SRS may be defined along with a periodic SRS. In the case of the aperiodic SRS, like a case of the periodic SRS, parameters to be used for generation of the aperiodic SRS may be transmitted, as RRC parameters, to user equipment 120 by a certain transmission/reception point. Herein, the parameters for generation of the aperiodic SRS may include a UE-specific SRS bandwidth of aperiodic SRS, a transmission comb, a frequency domain position, a periodicity, a subframe configuration, an antenna configuration, a base sequence index, a cyclic shift index, and so forth, as defined in wireless communication system 100.

In addition, a certain transmission/reception point may dynamically trigger user equipment 120 through a PDCCH such that user equipment 120 can transmit a periodic SRS. When receiving a triggering signal through the PDCCH and RRC parameters, user equipment 120 may transmit an uplink aperiodic SRS.

Hereinafter, in the case that a simultaneous transmission of an uplink PUCCH and a sounding reference signal (SRS) is considered within one subframe, an operation of corresponding user equipment will be described in detail.

In the case that a simultaneous transmission of the PUCCH and the SRS is considered, operations of corresponding user equipment may be defined (or configured) according to a PUCCH format type and an SRS type. Herein, the SRS may be classified into a periodic SRS (or referred to herein as "type 0 triggered SRS") and an aperiodic SRS (or referred to herein as "type 1 triggered SRS"). Furthermore, such operation of user equipment may be defined in consideration of adapting multiple component carriers.

Operations of user equipment according to an SRS type (e.g., a periodic SRS or an aperiodic SRS) and a PUCCH format may be defined as follows.

(i) In the case that a PUCCH format 2/2a/2b transmission and a periodic SRS transmission coincide in the same subframe, user equipment may not transmit an periodic SRS.

(ii) In the case that a PUCCH format 2/2a/2b transmission carrying ACK/NACK and an aperiodic SRS transmission coincide in the same subframe, user equipment may not transmit an aperiodic SRS.

(iii) In the case that a PUCCH format 2 transmission not carrying ACK/NACK and an aperiodic SRS transmission coincide in the same subframe, user equipment may not transmit the PUCCH format 2 without ACK/NACK.

(iv) In the case that a PUCCH format transmission carrying both or one of ACK/NACK and a scheduling request (SR) and an SRS transmission coincide in the same subframe, if the parameter "ackNackSRS-SimultaneousTransmission" defined by a higher layer is FALSE, user equipment may not transmit an SRS. Herein, the SRS may be a periodic SRS or an aperiodic SRS.

(v) In the case that a shorten PUCCH format transmission carrying both or one of ACK/NACK and a positive SR and an SRS transmission coincide in the same subframe, if the parameter "ackNackSRS-SimultaneousTransmission" defined by a higher layer is TRUE, user equipment may transmit both of the shorten PUCCH format and an SRS. Herein, the SRS may be a periodic SRS or an aperiodic SRS.

(vi) In the case that a PUCCH transmission carrying both or one of ACK/NACK and a positive SR using a normal PUCCH format and an SRS transmission on a serving cell coincide in the same subframe, user equipment may not transmit an SRS. Herein, the SRS may be a periodic SRS or an aperiodic SRS.

(vii) Meanwhile, the parameter "ackNackSRS-SimultaneousTransmission" may be provided by a higher layer as an RRC parameter. Such a RRC parameter may be used for determining if user equipment is configured to support a simultaneous transmission of HARQ ACK/NACK on PUCCH and an SRS in the same subframe. In the case that the user equipment is configured to support a simultaneous transmission of HARQ ACK/NACK on PUCCH and an SRS in one subframe, if a corresponding subframe is a cell-specific SRS subframe in a view of a first cell (e.g., primary cell, primary component carrier, Pcell), the user equipment may simultaneously transmit the HARQ ACK/NACK and the SRS using a shortened PUCCH format. Herein, the shortened PUCCH format may be used regardless of whether the SRS is transmitted in the corresponding subframe. If the corresponding subframe is not a cell-specific SRS subframe of the first cell, the user equipment may perform a transmission of HARQ ACK/NACK and an SRS using one of normal PUCCH format 1/1a/1b or normal PUCCH format 3.

Hereinafter, an operation of user equipment for a simultaneous transmission of ACK/NACK and a periodic CSI in one subframe on an uplink PUCCH will be described.

Figure 2:
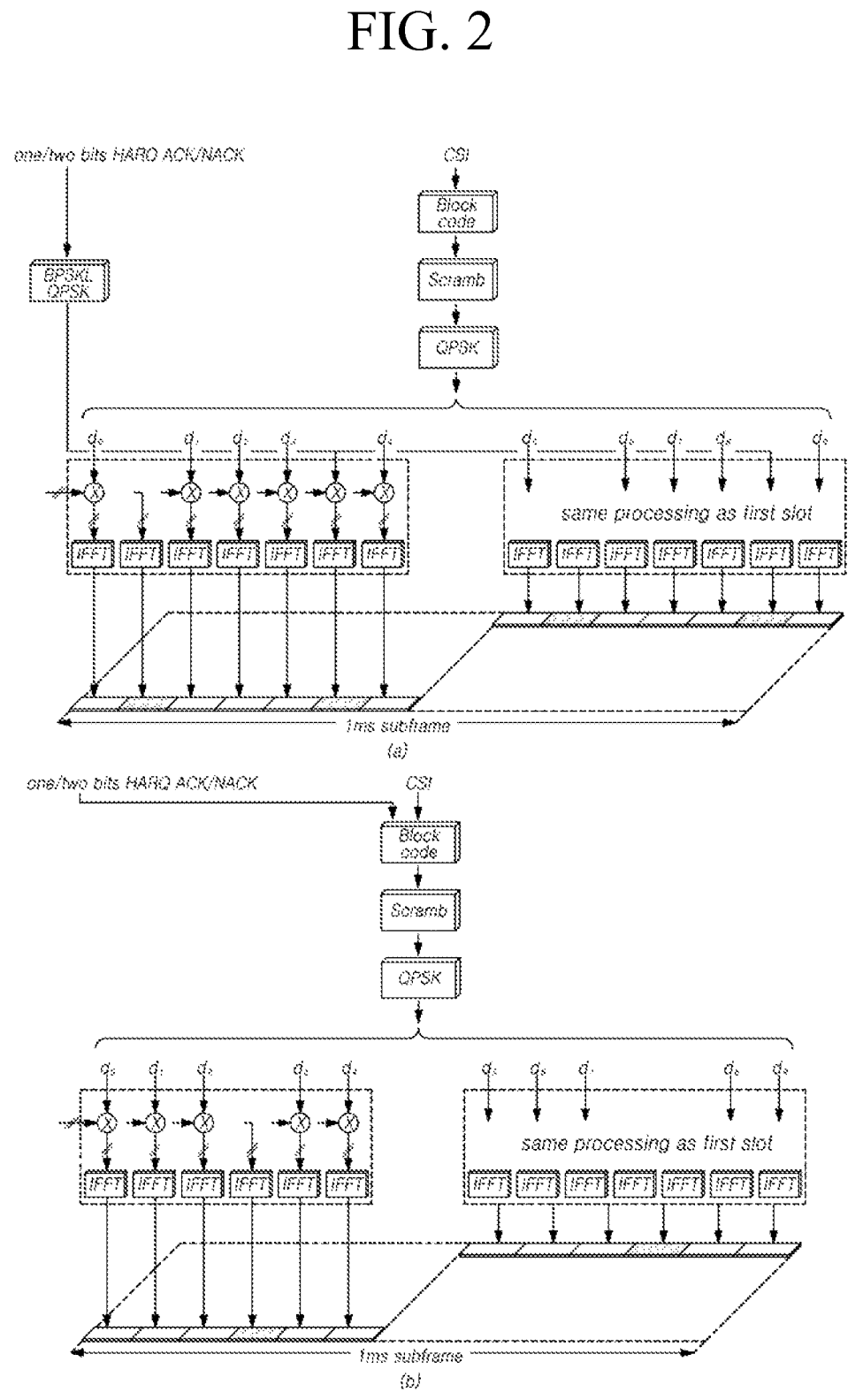

FIG. 2 is a diagram illustrating a simultaneous transmission of HARQ ACK/NACK and a CSI using PUCCH format 2 in accordance with at least one embodiment.

Referring to FIG. 2(a), in the case of a normal cyclic prefix (CP), HARQ ACK/NACK and a CSI may be simultaneously transmitted using PUCCH format 2. In this case, CSI transmission information may be block-coded and modulated using QPSK. As a result, each subframe may include ten symbols. The first five symbols may be transmitted in the first slot, and the remaining five symbols may be transmitted in the second slot.

Each slot may include seven DFTS-OFDM symbols. Among the seven DFTS-OFDM symbols in each slot, two symbols may be used for transmission of an uplink DM-RS. When HARQ ACK/NACK and a CSI are simultaneously transmitted, a second DM-RS symbol in each slot may be modulated by HARQ ACK/NACK. One of a BPSK modulation scheme and a QPSK modulation scheme may be used according to whether feedback information is 'one bit of HARQ ACK/NACK' or 'two bits of HARQ ACK/NACK.' In each slot, each of five QPSK symbols to be transmitted and the second modulated DM-RS symbol may be multiplied by a cyclic shifted length-12 cell-specific sequence. Herein, the second modulated DM-RS symbol may be the second DM-RS symbol modulated by HARQ ACK/NACK, among the DM-RS symbols in each slot. The multiplication result may be transmitted in a corresponding DFTS-OFDM symbol.

Referring to FIG. 2(b), in the case of an extended cyclic prefix (CP) having six DFTS-OFDM symbols per slot, the same structure may be used. However, each slot may include one uplink DM-RS symbol, instead of two uplink DM-RS symbols. CSI transmission information and HARQ ACK/NACK are block-coded and modulated using a QPSK modulation scheme. As a result, each subframe may include ten symbols. In this case, the first five symbols may be transmitted in the first slot, and the remaining five symbols may be transmitted in the second slot. Each of five QPSK symbols to be transmitted in each slot is multiplied by a cyclic shifted length-12 cell-specific sequence. The multiplication result may be transmitted in a corresponding DFTS-OFDM symbol.

For example, the parameter "simultaneousAckNackAndCQI" may be provided by a higher layer as an RRC parameter. Such an RRC parameter may be used for determining if user equipment is configured to support a simultaneous transmission of HARQ ACK/NACK and a periodic CSI in the same subframe. If the user equipment is configured to support a simultaneous transmission of HARQ ACK/NACK and a periodic CSI in one subframe, the user equipment may simultaneously transmit the HARQ-ACK and the periodic CSI using PUCCH format 2a/2b in a corresponding subframe.

Hereinafter, a power control method will be described according to whether a transmit power limitation exists. In other words, in the two cases (e.g., a power limited case and a non-power-limited case), a method of performing a power control in carrier aggregation will be described in detail. Particularly, methods of performing a power control (i) between uplink transmission channels, (ii) between an uplink channel and an SRS, and/or (iii) between SRSs, under carrier aggregation will be described in detail.

In the case that user equipment is configured to support a simultaneous transmission of PUCCH and PUSCH, if a total transmit power of the user equipment exceeds $\hat{P}_{CMAX}(i)$, the user equipment may first determine a transmit power for the PUCCH, and then determine a transmit power of a corresponding PUSCH for a serving cell ("c") within the remaining available transmit power. In this case, the user equipment may determine a PUSCH transmit power (i.e., a transmit power of the PUSCH) by scaling the PUSCH transmit power into a value between '0' and '1'.

In the above-described situation, user equipment may determine a transmit power of a corresponding PUSCH according to Formula 1 below. The user equipment may scale $\hat{P}_{PUSCH,c}(i)$ for a serving cell ("c") in subframe i such that the condition of Formula 1 below is satisfied.

$$\sum_c w(i) \cdot \hat{P}_{PUSCH,c}(i) \le (\hat{P}_{CMAX}(i) - \hat{P}_{PUCCH}(i)) \quad \text{[Formula 1]}$$

In Formula 1, $\hat{P}_{PUCCH}(i)$ denotes a linear value of $P_{PUCCH}(i)$, and $\hat{P}_{PUSCH,c}(i)$ denotes a linear value of $P_{PUSCH,c}(i)$. $\hat{P}_{CMAX}(i)$ denotes a linear value of the UE total configured maximum output power $P_{CMAX}$ in subframe i. w(i) denotes a scaling factor of $\hat{P}_{PUSCH,c}(i)$ for serving cell c, where $0 \le w(i) \le 1$. In the case that there is no PUCCH transmission in subframe i, $\hat{P}_{PUCCH}(i)=0$.

Meanwhile, if a total transmit power of user equipment exceeds $\hat{P}_{CMAX}(i)$, the user equipment may determine a transmit power between PUSCHs transmitted on different component carriers or different serving cells, according to whether a corresponding PUSCH includes uplink control information (UCI). More specifically, the user equipment may perform a PUSCH transmit power assignment in such a way that a serving cell or a component carrier associated with 'a PUSCH transmission with UCI' has a higher priority. In this case, transmit power for 'PUSCH without UCI' may be determined by performing a power scaling using an identical scaling factor between the remaining serving cells or component carriers. Herein, a scaling factor for a specific serving cell(s) or component carrier(s) may be set to '0'.

In the above-described situation, user equipment may determine a transmit power for a corresponding PUSCH according to Formula 2 below. If the user equipment has a PUSCH transmission with UCI on a serving cell j and a PUSCH transmission without UCI in any of the remaining serving cell(s), and if a total transmit power of the user equipment exceeds $\hat{P}_{CMAX}(i)$, the user equipment may scale $\hat{P}_{PUSCH,c}(i)$ for the serving cells without UCI in subframe i such that the condition of Formula 2 below is satisfied.

$$\sum_{c \neq j} w(i) \cdot \hat{P}_{PUSCH,c}(i) \leq \left( \hat{P}_{CMAX}(i) - \hat{P}_{PUSCH,j}(i) \right) \quad [\text{Formula 2}]$$

In Formula 2, $\hat{P}_{PUSCH,j}(i)$ denotes a PUSCH transmit power for a cell with UCI, and w(i) is a scaling factor of $\hat{P}_{PUSCH,c}(i)$ for a serving cell c without UCI. In this case, no power scaling may be applied to $\hat{P}_{PUSCH,j}(i)$ unless $$\sum_{c \neq j} w(i) \cdot \hat{P}_{PUSCH,c}(i) = 0$$

and a total transmit power of the user equipment exceed $\hat{P}_{CMAX}(i)$. Furthermore, w(i) values are the same across serving cells when w(i)>0, but for a certain serving cell(s) w(i) may be '0'.

Meanwhile, if a total transmit power of user equipment exceeds $\hat{P}_{CMAX}(i)$, the user equipment may perform a transmit power assignment between 'PUCCH/PUSCH transmission with UCI' (i.e., simultaneous PUCCH and PUSCH transmission with UCI) and 'PUSCH transmission without UCI' transmitted on different component carriers or different serving cells. More specifically, the user equipment may perform a transmit power assignment in such a way that (i) a PUCCH transmit power is first guaranteed and (ii) a PUSCH transmit power with UCI is secondly guaranteed. In this case, the remaining transmit power may be assigned for PUSCH without UCI. That is, transmit power for PUSCH without UCI may be determined by performing a power scaling using an identical scaling factor between the remaining serving cells or component carriers. Herein, a scaling factor for a specific serving cell(s) or component carrier(s) may be set to '0'.

In the above-described situation, user equipment may determine a transmit power of a corresponding PUSCH according to Formula 3 below. If the user equipment has a simultaneous PUCCH and PUSCH transmission with UCI on a serving cell j and a PUSCH transmission without UCI in any of the remaining serving cell(s), and if a total transmit power of the user equipment exceeds $\hat{P}_{CMAX}(i)$, the user equipment may obtain $\hat{P}_{PUSCH,c}(i)$ according to Formula 3 below.

$$\hat{P}_{PUSCH,j}(i) = \min\left( \hat{P}_{PUSCH,j}(i), \left( \hat{P}_{CMAX}(i) - \hat{P}_{PUCCH}(i) \right) \right) \quad [\text{Formula 3}]$$

$$\sum_{c \neq j} w(i) \cdot \hat{P}_{PUSCH,c}(i) \leq \left( \hat{P}_{CMAX}(i) - \hat{P}_{PUCCH}(i) - \hat{P}_{PUSCH,j}(i) \right)$$

Meanwhile, if a total transmit power of user equipment exceeds $\hat{P}_{CMAX}(i)$, the user equipment may perform a transmit power assignment between SRSs associated with different component carriers or different serving cells. More specifically, transmit power for SRSs may be determined by performing a power scaling using an identical scaling factor between the remaining serving cells or component carriers.

In the above-described situation, user equipment may determine transmit power of corresponding SRSs according to Formula 4 below. If a total transmit power of the user equipment for the SRSs exceeds $\hat{P}_{CMAX}(i)$, the user equipment may scale $\hat{P}_{SRS,c}(i)$ for a serving cell c in subframe i such that the condition of Formula 4 below is satisfied.

$$\sum_{c} w(i) \cdot \hat{P}_{SRS,c}(i) \leq \hat{P}_{CMAX}(i) \quad [\text{Formula 4}]$$

In Formula 4, $\hat{P}_{SRS,c}(i)$ denotes a linear value of $P_{SRS,c}(i)$, and $\hat{P}_{CMAX}(i)$ denotes a linear value of $P_{CMAX}$ in subframe i. w(i) denotes a scaling factor of $\hat{P}_{SRS,c}(i)$ for serving cell c, where 0<w(i)≤1. Herein, w(i) values may be the same across serving cells.

Meanwhile, in the case that carrier aggregation is applied, user equipment may transmit simultaneously an uplink channel (e.g., an uplink data channel and/or an uplink control channel) and an uplink signal (e.g., SRS) to a transmission/reception point. In this case, a single transmission timing advance (TA) value (i.e., a transmission TA value corresponding to a single value) of the user equipment may be identically applied to all different component carriers or all different serving cells. Herein, the transmission TA value may be indicated from the transmission/reception point. In the case that a single TA is applied, methods described above in association with multiplexing and/or power control between uplink channels may be used as operations of user equipment.

Figure 3:
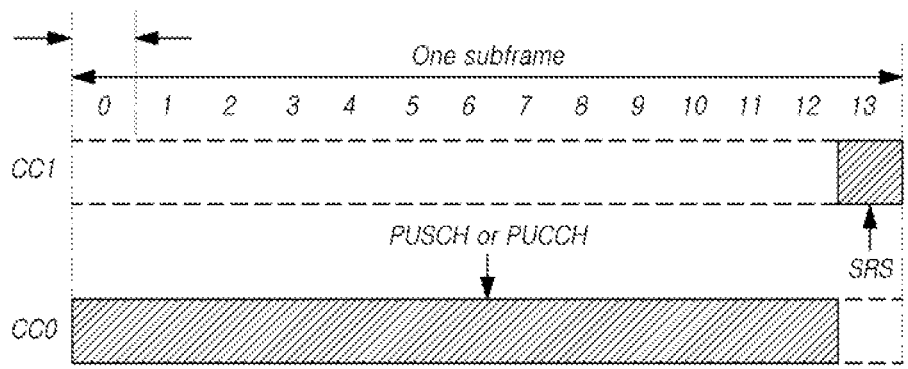
FIG. 3 is a diagram illustrating a concept of an uplink data/control channel(s) and an SRS in the case that a single timing advance (TA) is applied.

Typically, a simultaneous transmission of an uplink channel (e.g., an uplink data channel and/or an uplink control channel) and an SRS in the same symbol is generally not supported for the same component carrier and/or different component carriers. In this case, as shown in FIG. 3, if a single TA is applied, a symbol overlapping between an uplink channel (e.g., an uplink data channel and/or an uplink control channel) and an SRS might be effectively prevented.

However, in the case that multiple transmission TA values are indicated for the user equipment, multiplexing and/or power control methods between an uplink channel and an uplink signal on different component carriers (or serving cells) or component carrier groups (or serving cell groups) might be required to be different from multiplexing and/or power control methods in the case of a single TA. In other words, a boundary of uplink SC-FDMA symbols in one subframe may not accurately coincide between different component carriers (or serving cells) or different component carrier groups (or serving cell groups). For this reason, there may be an ambiguity when corresponding user equipment transmits an uplink channel (e.g., an uplink data channel and/or an uplink control channel) and an uplink signal. Accordingly, a transmission/reception point and the corresponding user equipment may not necessarily recognize how operations of the corresponding user equipment is are performed.

Figure 4:
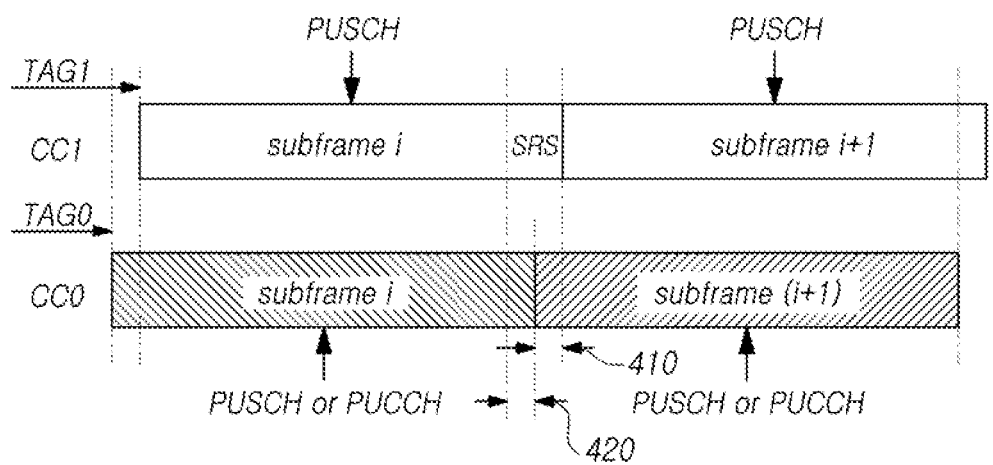
FIG. 4 illustrates a symbol overlapping or collision between different component carriers (or serving cells) or component carrier groups (or serving cell groups), and between an uplink data/control channel(s) and an SRS in the case that multiple transmission TA values for user equipment are indicated.

In other words, as shown in FIG. 4, in the case that multiple TA values for user equipment are indicated, there may be an overlapping or collision problem (e.g., a symbol overlapping, and/or an overlapping or collision within one symbol) of an uplink channel (e.g., an uplink data channel and/or an uplink control channel) and an SRS, between different component carriers (or serving cells) or different component carrier groups (or serving cell groups). For example, in the case that CC0 (Pcell) and CC1 (Scell) are configured with different timing advance groups (TAGs) (e.g., TAG0, TAG1), there may be an ambiguity associated with an uplink transmission (e.g., transmission of an uplink channel and an uplink signal) of user equipment, at the regions "410" and "420". Accordingly, there also may be an ambiguity associated with an uplink reception (i.e., reception of an uplink channel and an uplink signal) in a transmission/reception point.

Accordingly, in the case that user equipment is configured with multiple TAGs, multiplexing and power control methods associated with an uplink channel (e.g., an uplink data channel and/or an uplink control channel) and an uplink signal transmitted by the user equipment may be required to be defined.

The present embodiment is related to transmission and multiplexing methods associated with control channels transmitted on uplink by user equipment, in the case that carrier aggregation is applied. Furthermore, the present embodiment is related to a method and an apparatus for multiplexing an uplink control channel and an SRS. Particularly, in the case that multiple TAGs are adapted, the present embodiment may provide multiplexing and transmitting (i) between uplink control channels and an SRS and (ii) between SRSs.

More specifically, in the case that an uplink channel (e.g., an uplink control channel and/or an uplink data channel) and an SRS to be transmitted by user equipment are on different component carriers associated with multiple TAGs under carrier aggregation, operations of the user equipment may be required to be newly defined.

Furthermore, in the case that multiple TAGs are configured, the present embodiment may define operations of user equipment such that a backward compatibility is supported. Meanwhile, if a backward compatibility is not required to be supported, the present embodiment may define new operations of user equipment.

In this case, although a transmission/reception has formed multiple TAGs for user equipment, if operations of the user equipment are associated with two or more uplink component carriers, specific component carriers may belong to the same TAG. For example, in the case that two uplink component carriers are formed, each uplink component carrier may belong to the same TAG. For another example, in the case that three uplink component carriers are formed, two uplink component carriers may belong to the same TAG, and the other uplink component carrier may belong to another TAG (i.e., a different TAG).

Accordingly, when considering the above-described scenario, in the case that component carriers associated with transmission of an uplink channel (e.g., an uplink control channel and/or an uplink data channel) and an SRS belong to the same TAG, operations of user equipment may be defined such that the user equipment operates according to an uplink channel/SRS transmission method (i.e., a transmission method of an uplink control/data channel and an SRS) defined in association with a single TA.

Typically, only a single TA is generally supported. However, even in the case that multiple TAGs are formed, in order to guarantee a backward compatibility, operations of user equipment for component carriers formed to belong to the same TAG may be determined (or defined) according to whether a transmit power to be transmitted by the user equipment is limited (i.e., according to corresponding to a power limited situation or a non-power-limited situation) as described later.

First, in the case ("Case 1") that (i) different component carriers belong to the same TAG, or different component carriers belonging to different TAGs are fully overlapped, (ii) a simultaneous transmission of PUCCH/PUSCH and an SRS is expected, and (iii) a transmit power is limited, operations of user equipment may be defined as below.

For a simultaneous transmission of a PUCCH and an SRS (referred to herein as "PUCCH+SRS"), if a PUCCH format 2 transmission overlaps with an aperiodic SRS transmission, operations of user equipment may be defined to transmit the aperiodic SRS. Otherwise, the user equipment may be defined to always drop the SRS.

For a simultaneous transmission of a PUSCH and an SRS (referred to herein as "PUSCH+SRS"), if the PUSCH includes UCI, operations of user equipment may be defined such that a transmit power for a PUSCH with UCI is first guaranteed and the remaining transmit power is used for an SRS transmission. In this case, if there is no remaining transmit power for the SRS transmission, user equipment may drop the SRS.

For a simultaneous transmission of a PUCCH, a PUSCH and an SRS (referred to herein as "PUCCH+PUSCH+SRS"), if a PUCCH format 2 transmission overlaps with an aperiodic SRS transmission, operations of user equipment may be defined such that the PUSCH and the aperiodic SRS are transmitted. With respect to transmit power of the PUSCH and the aperiodic SRS, if the PUSCH includes UCI, operations of user equipment may be defined such that a transmit power for the PUSCH with the UCI is first guaranteed and the remaining transmit power is used for the aperiodic SRS transmission.

Furthermore, in this case, regardless of whether a PUSCH includes UCI, operations of user equipment may be defined to transmit PUSCH where the last symbol reserved for an SRS transmission in a corresponding subframe is punctured such that the last symbol reserved for the SRS transmission is not mapped to a resource element for the PUSCH. In other words, in the case that user equipment is configured with multiple TAGs, and performs a simultaneous transmission of an SRS and a PUSCH on the same cell, the user equipment may be defined such that the last symbol of a subframe transmitting the PUSCH is not mapped to a resource element for the PUSCH. Hereinafter, the above-described embodiment may be described in detail as Embodiment 1, with reference to FIG. 5 and FIG. 6.

Except in such case, operations of the user equipment may be defined to always drop an SRS. Herein, a corresponding subframe may be a UE-specific aperiodic SRS subframe or a cell-specific SRS subframe. More specifically, the user equipment may be configured with multiple TAGs and perform a simultaneous transmission of an SRS and a PUSCH/PUCCH on different cells. In this case, if the SRS transmission of the user equipment in a symbol on a subframe (e.g., subframe i) for a given serving cell overlaps with PUCCH/PUSCH transmission on a subframe (e.g., subframe i or subframe i+1) for a different serving cell(s), and if its total transmit power exceeds $P_{CMAX}$ on any overlapped portion of the symbol, the user equipment may drop the SRS in the subframe (e.g., subframe i) associated with the SRS transmission. Hereinafter, the above-described embodiment may be described in detail as Embodiment 2, with reference to FIG. 7 and FIG. 8.

For a simultaneous transmission of an SRS and another SRS (referred to herein as "SRS+SRS"), user equipment may determine an SRS transmit power by performing a power scaling using an identical scaling value (i.e., an identical scaling factor) such that the user equipment can operate in a typical manner (i.e., such that the user equipment operates according to a typical or existing UE behavior). More specifically, in this case, if (i) user equipment is configured with multiple TAGs and (ii) there is a transmit power limitation (i.e., a total transmit power exceeds a maximum allowable transmit power ($P_{CMAX}$) of the user equipment on any overlapped portion between symbols associated with SRS transmissions), the user equipment may determine an SRS transmit power by performing a power scaling using an identical scaling factor when simultaneously transmitting 'an SRS and another SRS' ("SRS+SRS") for different cells. Hereinafter, the above-described embodiment may be described in detail as Embodiment 3, with reference to FIG. 9 and FIG. 10.

Second, in the case ("Case 2") that (i) different component carriers belong to the same TAG, or different component carriers belonging to different TAGs are fully overlapped, (ii) a simultaneous transmission of PUCCH/PUSCH and an SRS is expected, and (iii) there is no transmit power limitation, operations of user equipment may be defined such that the user equipment is operated according to UE operations described with reference to Formula 1 to Formula 4.

Third, in the case ("Case 3") that (i) different component carriers belonging to different TAGs are not fully overlapped (i.e., partly overlapped), (ii) a simultaneous transmission of PUCCH/PUSCH and an SRS is expected, and (iii) there is a transmit power limitation, operations of user equipment may be defined as below.

For PUCCH+SRS (i.e., a simultaneous transmission of a PUCCH and an SRS), the user equipment may drop the SRS on a corresponding component carrier, and transmit only the PUCCH.

For PUSCH+SRS (i.e., a simultaneous transmission of a PUSCH and an SRS), the user equipment may drop the SRS on a corresponding component carrier, and transmit only the PUSCH.

For PUCCH+PUSCH+SRS (i.e., a simultaneous transmission of a PUCCH, a PUSCH and an SRS), the user equipment may drop the SRS on a corresponding component carrier, and transmit the PUCCH and PUSCH according to a transmit power determination method for a simultaneous transmission of PUCCH and PUSCH ("PUCCH+PUSCH"). As described in Embodiment 2, in the case that user equipment is configured with multiple TAGs and a full or partial overlapping is in different TAGs, a simultaneous transmission of the SRS and the PUSCH/PUCCH in different cells may be performed. In this case, if a total transmit power exceeds a maximum allowable transmit power ($P_{CMAX}$) of the user equipment on any overlapped portion between symbols transmitting the SRS and the PUCCH/PUSCH on the different cells, the user equipment may drop the SRS in a subframe associated with an SRS transmission. More specifically, if the SRS transmission of the user equipment in a symbol on a subframe (e.g., subframe i) for a given serving cell overlaps with PUCCH/PUSCH transmission on a subframe (e.g., subframe i or subframe i+1) for a different serving cell(s), and if its total transmit power exceeds $P_{CMAX}$ on any overlapped portion of the symbol, the user equipment may drop the SRS in the subframe (e.g., subframe i) associated with the SRS transmission.

For SRS+SRS (i.e., a simultaneous transmission of an SRS and another SRS), user equipment may determine an SRS transmit power by performing a power scaling using an identical scaling value (i.e., an identical scaling factor) such that the user equipment can operate in a typical manner (i.e., such that the user equipment operates according to a typical or existing UE behavior). As described in Embodiment 3, if (i) user equipment is configured with multiple TAGs and (ii) there is a transmit power limitation (i.e., a total transmit power exceeds a maximum allowable transmit power ($P_{CMAX}$) of the user equipment on any overlapped portion between symbols associated with SRS transmissions), the user equipment may determine an SRS transmit power by performing a power scaling using an identical scaling factor when simultaneously transmitting an SRS and another SRS for different cells.

Fourth, in the case ("Case 4") that (i) different component carriers belonging to different TAGs are not fully overlapped (i.e., partly overlapped), (ii) a simultaneous transmission of PUCCH/PUSCH and an SRS is expected, and (iii) there is no transmit power limitation, operations of user equipment may be defined as below.

For PUCCH+SRS (i.e., a simultaneous transmission of a PUCCH and an SRS), the user equipment may transmit the SRS on a component carrier intended for an SRS transmission, along with a PUCCH transmission.

For PUSCH+SRS (i.e., a simultaneous transmission of a PUSCH and an SRS), the user equipment may transmit the SRS on a component carrier intended for an SRS transmission, along with a PUSCH transmission.

For PUCCH+PUSCH+SRS (i.e., a simultaneous transmission of a PUCCH, a PUSCH and an SRS), the user equipment may transmit the SRS on a component carrier intended for an SRS transmission, along with a PUCCH transmission and a PUSCH transmission.

For SRS+SRS (i.e., a simultaneous transmission of an SRS and another SRS), user equipment may determine an SRS transmit power by performing a power scaling using an identical scaling value (i.e., an identical scaling factor) such that the user equipment can operate in a typical manner (i.e., such that the user equipment operates according to a typical or existing UE behavior).

Figure 5:
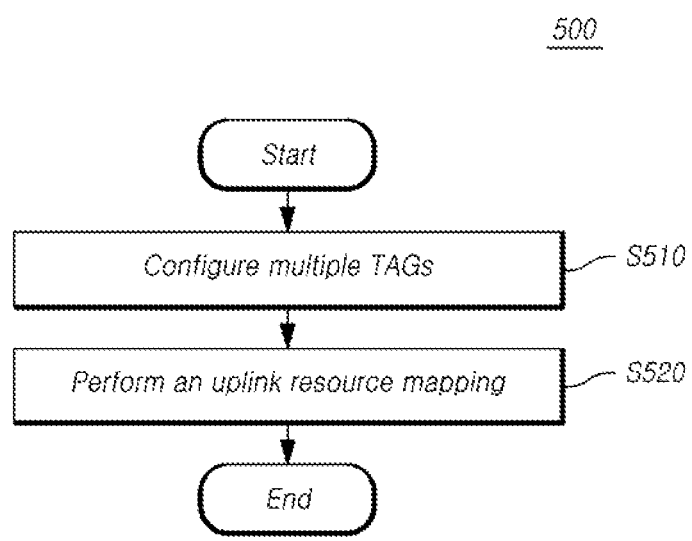
FIG. 5 is a flowchart illustrating a method of controlling an uplink power in user equipment in accordance with Embodiment 1.
Figure 6:
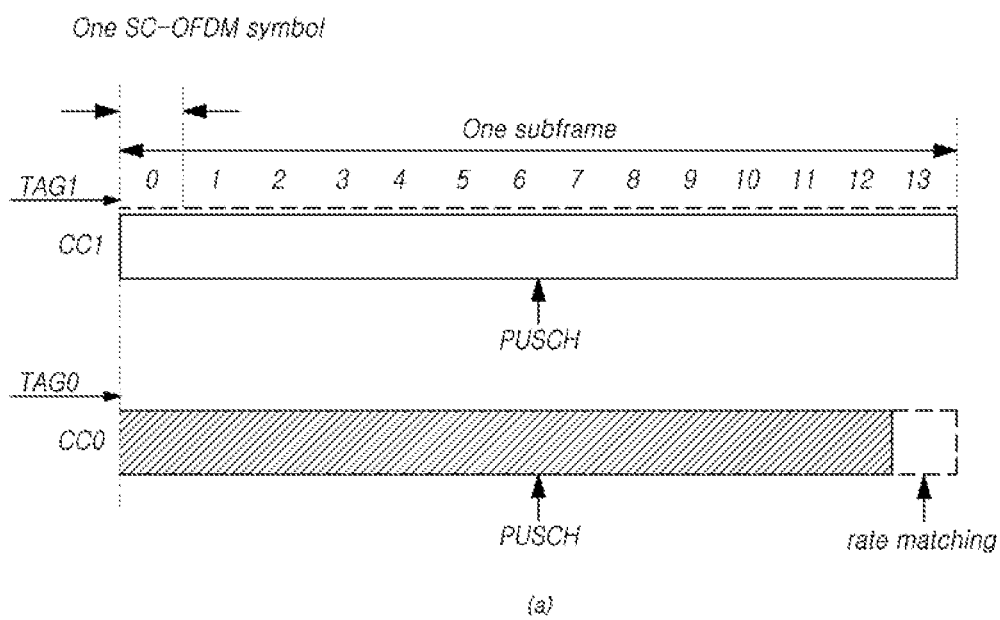
FIG. 6 is a diagram illustrating a concept of controlling an uplink power in user equipment in accordance with Embodiment 1.
Figure 6:
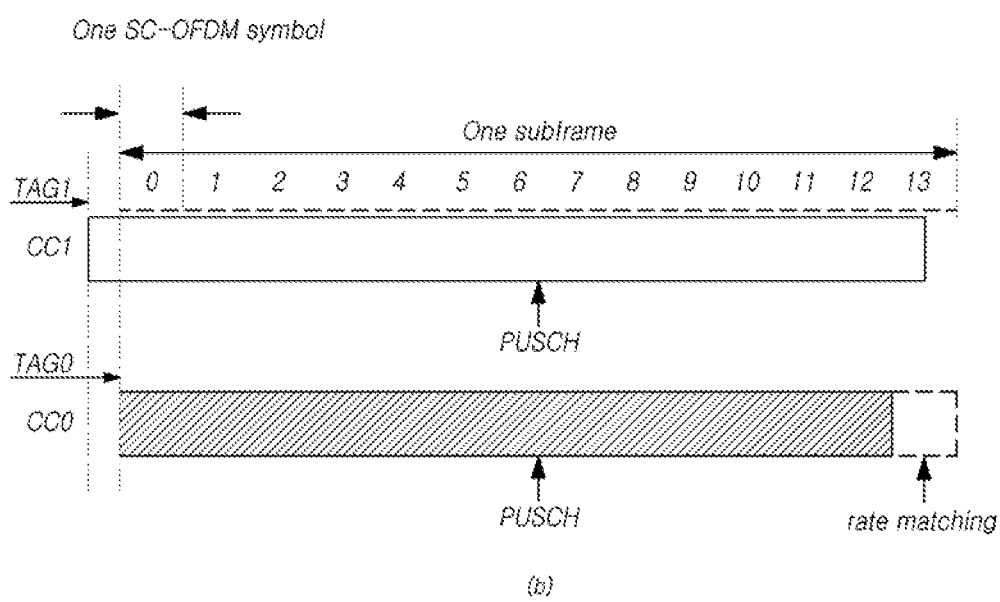

FIG. 5 is a flowchart illustrating a method of controlling an uplink power in user equipment in accordance with Embodiment 1. FIG. 6 is a diagram illustrating a concept of controlling an uplink power in user equipment in accordance with Embodiment 1.

Referring to FIG. 5, a method (500) of controlling an uplink power in user equipment according to Embodiment 1 may include (i) configuring multiple TAGs at step S510 and (ii) performing an uplink resource mapping at step S520.

At step S510, user equipment may be configured with multiple TAGs, by a transmission/reception point (e.g., a base station). The user equipment may receive configuration information associated with multiple TAGs (e.g., TAG configuration information) from the transmission/reception point, and configure (or form) multiple TAGs. For example, the TAG configuration information may be transmitted to the user equipment, through downlink control information (e.g., PDCCH) or higher layer signaling (e.g., an RRC message) from the transmission/reception point.

At step S520, in the case of a simultaneous transmission of an SRS and a PUSCH on the same cell, the user equipment may perform an uplink resource mapping such that resource elements for the PUSCH are mapped to the SC-FDMA symbols excluding the last symbol assigned for an SRS transmission in a subframe.

In other words, as shown in FIG. 6, in the case that multiple TAGs (e.g., TAG0 and TAG1) are formed, if user equipment is defined to transmit an SRS in the same subframe in the same cell as a cell transmitting a PUSCH, a rate matching may be performed for the last symbol associated with a PUSCH transmission. In this case, as shown in FIG. 6(a), when multiple TAGs are applied, an uplink channel (e.g., an uplink data channel and/or an uplink control channel) and an SRS between different component carriers (e.g., CC0, CC1) or component carrier groups may be fully overlapped. Alternatively, as shown in FIG. 6(b), in the case that multiple TAGs are applied, an uplink channel (e.g., an uplink data channel and/or an uplink control channel) and an SRS between different component carriers (e.g., CC0, CC1) or different component carrier groups may be partly overlapped.

Herein, the "cell" may be one component carrier. The SRS may be one of a periodic SRS and an aperiodic SRS.

More specifically, in the case that PUSCH is mapped to physical resources, a mapping to time and frequency resource elements (k, l) corresponding to a physical resource block (or physical resource blocks) assigned for a PUSCH transmission may not be used for an SC-FDMA symbol reserved for a possible SRS transmission for a UE-specific periodic SRS in the same serving cell. In other words, regardless of whether a PUSCH includes UCI, operations of user equipment may be defined to transmit PUSCH where the last symbol reserved for an SRS transmission in a corresponding subframe is punctured such that the last symbol reserved for the SRS transmission is not mapped to a resource element for the PUSCH.

Figure 7:
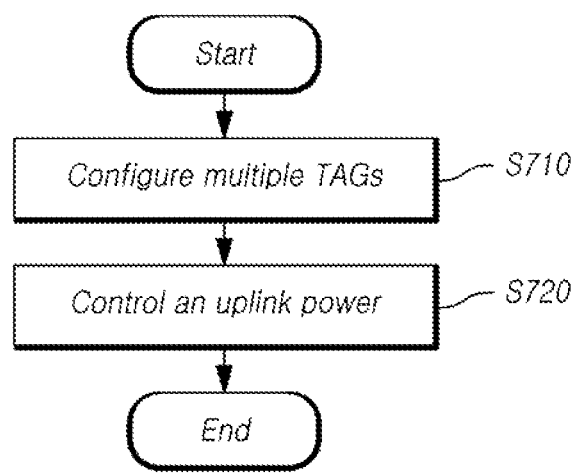
FIG. 7 is a flowchart illustrating a method of controlling an uplink power in user equipment in accordance with Embodiment 2.
Figure 8:
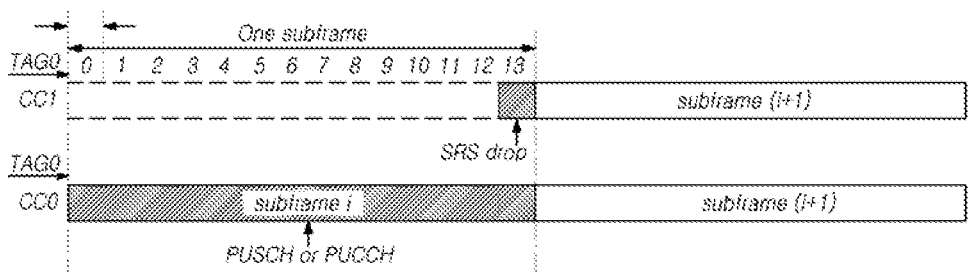
FIG. 8 is a diagram illustrating a concept of controlling an uplink power in user equipment in accordance with Embodiment 2.
Figure 8:
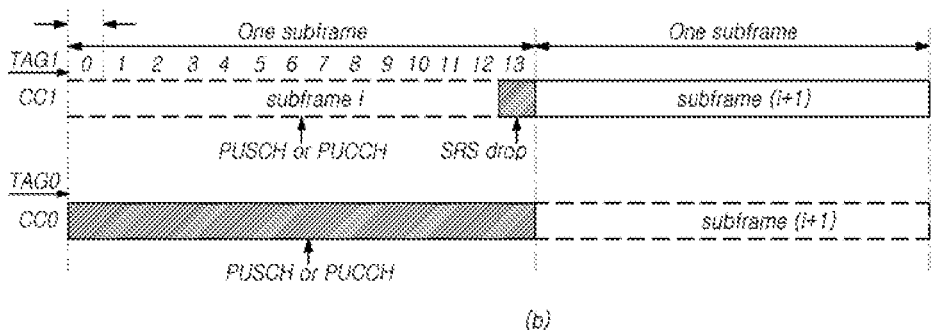
Figure 8:
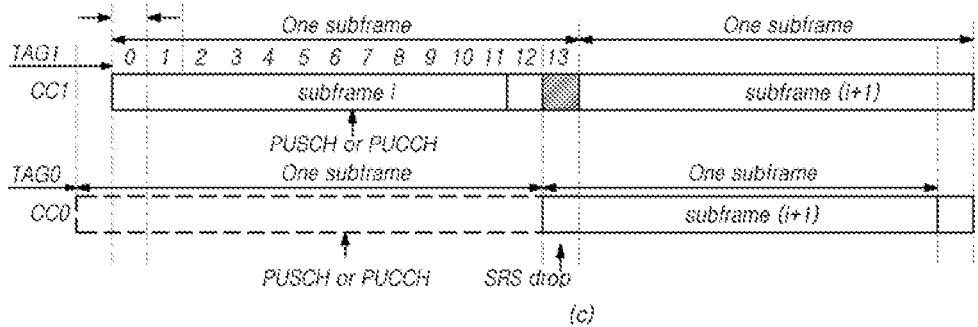
Figure 8:
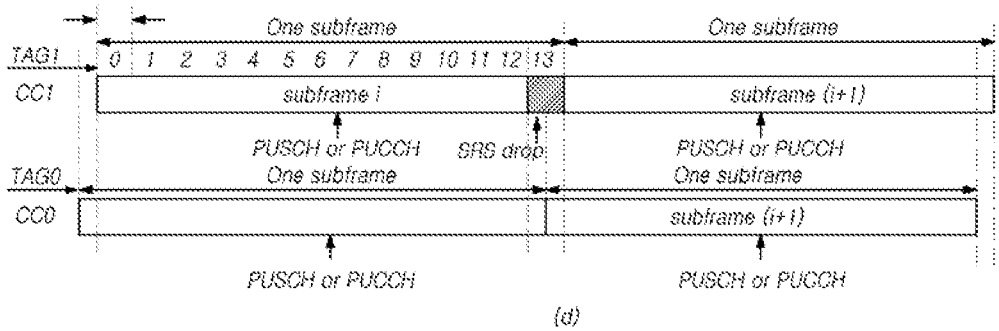

FIG. 7 is a flowchart illustrating a method of controlling an uplink power in user equipment in accordance with Embodiment 2. FIG. 8 is a diagram illustrating a concept of controlling an uplink power in user equipment in accordance with Embodiment 2.

Referring to FIG. 7, a method (700) of controlling an uplink power in user equipment according to Embodiment 2 may include (i) configuring (or forming) multiple TAGs at step S710 and (ii) controlling an uplink power at step S720.

At step S710, user equipment may be configured with multiple TAGs, by a transmission/reception point (e.g., a base station). The user equipment may receive configuration information associated with multiple TAGs (e.g., TAG configuration information) from the transmission/reception point, and configure (or form) multiple TAGs. For example, the TAG configuration information may be transmitted to the user equipment, through downlink control information (e.g., PDCCH) or higher layer signaling (e.g., an RRC message) from the transmission/reception point.

At step S720, in the case that a simultaneous transmission of an SRS and PUSCH/PUCCH is performed in different cells, if a total transmit power exceeds a maximum allowable transmit power ($P_{CMAX}$) of the user equipment on any overlapped portion between symbols transmitting the SRS and the PUCCH/PUSCH on the different cells, the user equipment may drop the SRS in a subframe associated with an SRS transmission. Herein, the different cells may be two or more different component carriers. The SRS may be one of a periodic SRS and an aperiodic SRS.

In other words, if the SRS transmission of user equipment in a symbol on a subframe (e.g., subframe i) for a given serving cell in a TAG overlaps with PUCCH/PUSCH transmission on a subframe (e.g., subframe i or subframe i+1) for a different serving cell in the same or another TAG, the user equipment may drop the SRS if its total transmit power exceeds $P_{CMAX}$ on any overlapped portion of the symbol.

More specifically, as shown in FIG. 8(a), in the case that (i) different component carriers (e.g., CC0 and CC1) belong to the same TAG (e.g., TAG0), and (ii) a simultaneous transmission of an SRS and PUSCH/PUCCH is performed for different cells, user equipment may transmit or drop the SRS according to whether a transmit power limitation exists. For example, in the case that there is no transmit power limitation, if multiple TAGs are formed, the user equipment may transmit the SRS. In the case that there is a transmit power limitation, the user equipment may drop the SRS. Meanwhile, as shown in FIG. 8(b) and FIG. 8(c), in the case that (i) different component carriers (e.g., CC0 and CC1) belong to different TAGs (e.g., TAG0 and TAG1) and (ii) an SRS transmission and PUSCH/PUCCH transmission are fully overlapped, when performing a simultaneous transmission of an SRS and PUSCH/PUCCH for different cells, user equipment may transmit or drop the SRS according to whether a transmit power limitation exists. For example, in the case that no transmit power limitation exists, if multiple TAGs are formed, the user equipment may transmit the SRS. In the case that a transmit power limitation exists, the user equipment may drop the SRS. Meanwhile, as shown in FIG. 8(d), in the case that (i) different component carriers (e.g., CC0 and CC1) belong to different TAGs (e.g., TAG0 and TAG1) and (ii) an SRS transmission and PUSCH/PUCCH transmission are partly overlapped, when performing a simultaneous transmission of an SRS and PUSCH/PUCCH for different cells, user equipment may transmit or drop the SRS according to whether a transmit power limitation exists. For example, in the case that no transmit power limitation exists, if multiple TAGs are formed, the user equipment may transmit the SRS. In the case that a transmit power limitation exists, the user equipment may drop the SRS.

Meanwhile, in the case that user equipment is configured with three or more serving cells, if an SRS transmission of user equipment in a symbol on a subframe (e.g., subframe i) for a given serving cell in a TAG overlaps (i) with an SRS transmission on a subframe (e.g., subframe i) for a different serving cell(s) and (ii) with PUCCH/PUSCH transmission on a subframe (e.g., subframe i or subframe i+1) for another serving cell(s), the user equipment may drop the SRS if the total transmit power exceeds $P_{CMAX}$ on any overlapped portion of the symbol. In other words, if user equipment is configured with three or more serving cells, user equipment may perform a simultaneous transmission of SRS+SRS+PUSCH/PUCCH (i.e., a simultaneous transmission of an SRS, another SRS, and PUSCH/PUCCH) on three or more component carriers in two or more TAGs. In this case, if a corresponding symbol is fully or partly overlapped and there is a transmit power limitation, the user equipment may drop all the SRSs before performing another power scaling. In this case, if no transmit power limitation exists, the user equipment may transmit all the SRSs.

Figure 9:
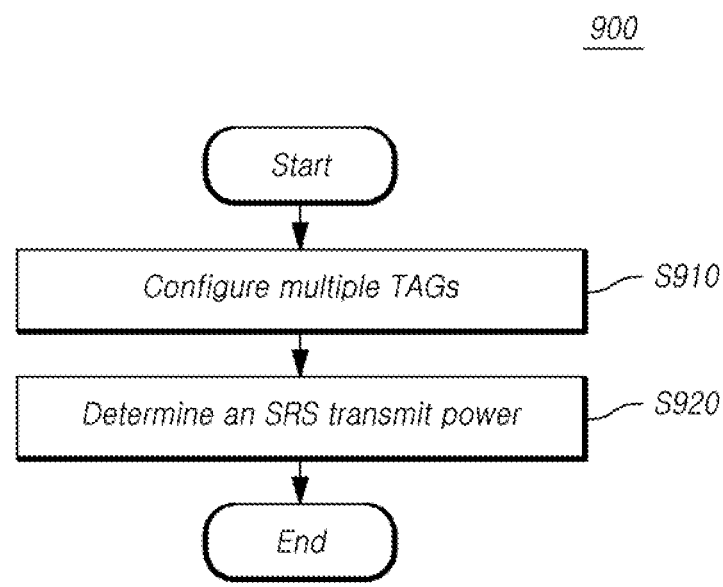
FIG. 9 is a flowchart illustrating a method of controlling an uplink power in user equipment in accordance with Embodiment 3.
Figure 10:
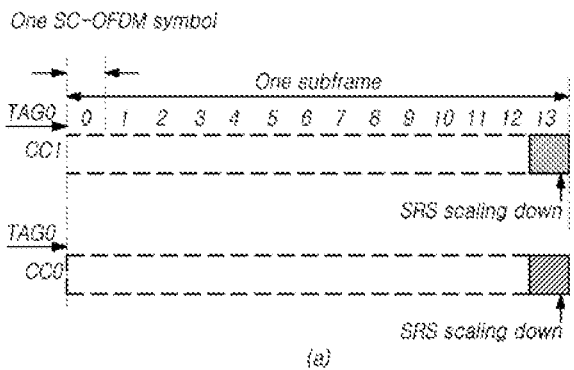
FIG. 10 is a diagram illustrating a concept of controlling an uplink power in user equipment in accordance with Embodiment 3.
Figure 10:
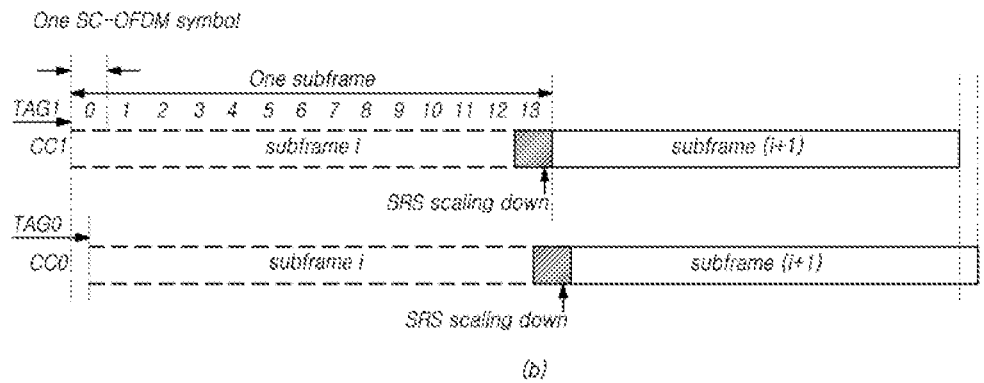
Figure 10:
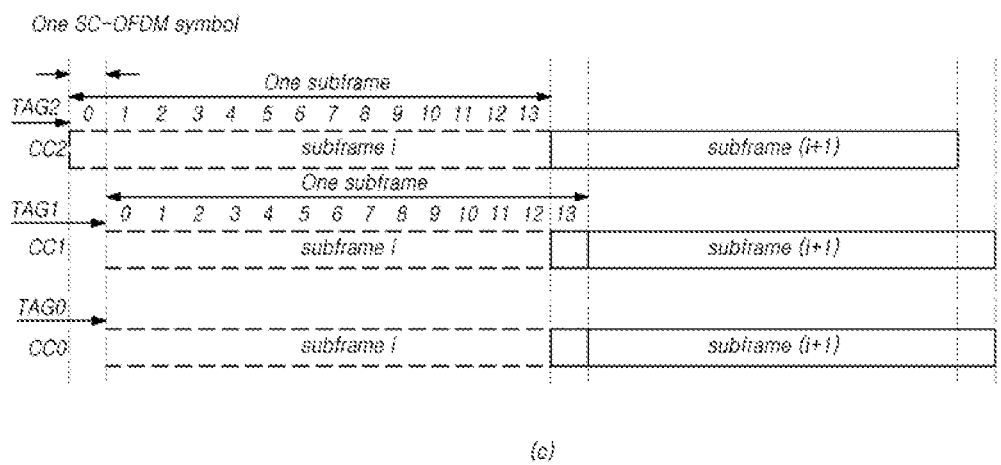

FIG. 9 is a flowchart illustrating a method of controlling an uplink power in user equipment in accordance with Embodiment 3. FIG. 10 is a diagram illustrating a concept of controlling an uplink power in user equipment in accordance with Embodiment 3.

Referring to FIG. 9, a method (900) of controlling an uplink power in user equipment according to Embodiment 3 may include (i) configuring multiple TAGs at step S910 and (ii) determining an SRS transmit power at step S920.

At step S910, user equipment may be configured with multiple TAGs, by a transmission/reception point (e.g., a base station). The user equipment may receive configuration information associated with multiple TAGs (e.g., TAG configuration information) from the transmission/reception point, and configure (or form) multiple TAGs. For example, the TAG configuration information may be transmitted to the user equipment, through downlink control information (e.g., PDCCH) or higher layer signaling (e.g., an RRC message) from the transmission/reception point.

At step S920, in the case that there is a transmit power limitation and a simultaneous transmission of an SRS and another SRS ("SRS+SRS") on different cells is performed, user equipment may determine an SRS transmit power by performing an identical power scaling, where a scaling factor is greater than 0 and less than or equal to 1. In other words, as shown in FIG. 10(a) (in the case that TAGs are the same), FIG. 10(b) (in the case that TAGs are different and there is a partial overlapping), and FIG. 10(c) (in the case that TAGs are different and there is a full overlapping), user equipment may determine an SRS transmit power by performing an identical scaling. More specifically, if (i) an SRS transmission of user equipment in a symbol on a subframe (e.g., subframe i) for a given serving cell in one TAG (e.g., TAG0) partly or fully overlaps with an SRS transmission on a subframe (e.g., subframe i) for a different serving cell in a different TAG (e.g., TAG1) and (ii) there is a transmit power limitation, the user equipment may determine an SRS transmit power for a simultaneous transmission of "SRS+SRS" by performing an identical scaling such that a total transmit power does not exceed $P_{CMAX}$. In this case, if there is no transmit power limitation, the user may transmit the SRSs without performing a power scaling. Herein, the different cells may be 2 or more different component carriers. The SRS may be one of a periodic SRS and an aperiodic SRS.

Figure 11:
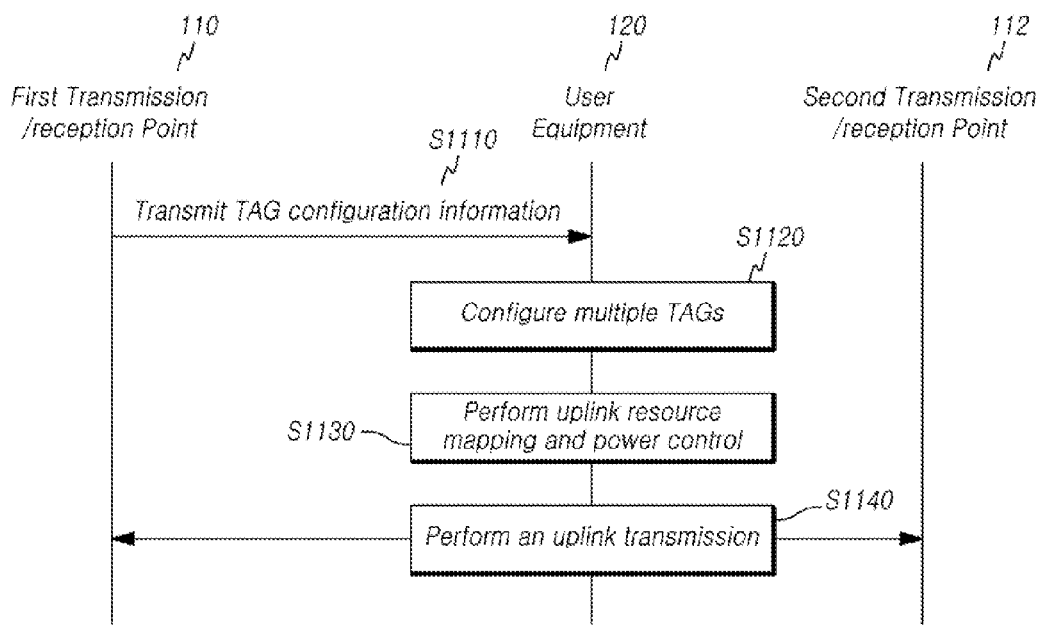
FIG. 11 is a system flowchart illustrating a method of controlling an uplink power in accordance with other embodiments.

FIG. 11 is a system flowchart illustrating a method of controlling an uplink power in accordance with other embodiments.

Referring to FIG. 1 and FIG. 11, at step S1110, under coordinated multi-point transmission/reception (CoMP) or carrier aggregation (CA), the first transmission/reception point (e.g., eNB 110) corresponding to a serving cell may transmit configuration information associated with multiple TAGs (e.g., TAG configuration information) to user equipment 120 (UE1). Herein, the TAG configuration information may be transmitted to user equipment 120 (UE1), through downlink control information (e.g., PDCCH) or higher layer signaling (e.g., an RRC message) from the first transmission/reception point (e.g., eNB 110).

At step S1120, user equipment 120 (UE1) may receive the TAG configuration information, and configure (or form) multiple TAGs. As described above, although user equipment is configured with multiple TAGs by a transmission/reception point, specific component carriers under carrier aggregation (CA) may belong to the same TAG. For example, in the case that two uplink component carriers are configured, each component carrier may belong to the same TAG. For another example, in the case that three uplink component carriers are configured, two uplink component carriers may belong to the same TAG, and the other uplink component carrier may belong to another TAG (i.e., a different TAG).

At step S1130, user equipment 120 (UE1) may perform a resource mapping and a power control associated with an uplink channel (e.g., an uplink data channel and/or an uplink control channel) and an SRS, according to Case 1 through Case 4 as described above. Herein, "Case 1" represents the case that (i) different component carriers belong to the same TAG, or different component carriers belonging to different TAGs are fully overlapped, (ii) a simultaneous transmission of PUCCH/PUSCH and an SRS is expected, and (iii) a transmit power limitation exists. "Case 2" represents the case that (i) different component carriers belong to the same TAG, or different component carriers belonging to different TAGs are fully overlapped, (ii) a simultaneous transmission of PUCCH/PUSCH and an SRS is expected, and (iii) no transmit power limitation exists. "Case 3" represents the case that (i) different component carriers belonging to different TAGs are not fully overlapped (i.e., partly overlapped), (ii) a simultaneous transmission of PUCCH/PUSCH and an SRS is expected, and (iii) a transmit power limitation exists. "Case 4" represents the case that (i) different component carriers belonging to different TAGs are not fully overlapped (i.e., partly overlapped), (ii) a simultaneous transmission of PUCCH/PUSCH and an SRS is expected, and (iii) no transmit power limitation exists.

At step S1130, for example, as described with reference to FIG. 5 and FIG. 6, in the case of a simultaneous transmission of an SRS and a PUSCH on the same cell, the user equipment may perform an uplink resource mapping such that resource elements for the PUSCH are mapped to the SC-FDMA symbols excluding the last symbol assigned for an SRS transmission in a subframe. Since such operation was described in detail with respect to Embodiment 1 above, the detailed description thereof is omitted.

At step S1130, for another example, as described with reference to FIG. 7 and FIG. 8, in the case that a simultaneous transmission of an SRS and PUSCH/PUCCH is performed in different cells, if a total transmit power exceeds a maximum allowable transmit power ($P_{CMAX}$) of the user equipment on any overlapped portion between symbols transmitting the SRS and the PUCCH/PUSCH on the different cells, the user equipment may drop the SRS in a subframe associated with an SRS transmission. Since such operation was already described in detail as Embodiment 2, the detailed description thereof is omitted.

At step S1130, for still another example, as described with reference to FIG. 9 and FIG. 10, in the case that a transmit power limitation exists and a simultaneous transmission of an SRS and another SRS ("SRS+SRS") on different cells is performed, user equipment 120 may determine an SRS transmit power by performing an identical power scaling. Since such operation was described in detail with respect to Embodiment 3 above, the detailed description thereof is omitted.

Furthermore, in the case that two or more different component carriers are configured for an uplink transmission of user equipment, and the user equipment is configured with multiple TAGs, operations of the user equipment may be defined according to whether the user equipment is in a power limited situation or a non-power-limited situation. Particularly, a UE operation method associated with the case that (i) different component carriers (CCs) belong to the same TAG or (ii) different component carriers belonging to different TAGs are fully overlapped may be first applied. Thereafter, UE operations associated with the case that different component carriers belonging to different TAGs are not fully overlapped (i.e., partly overlapped) may be further applied.

In other words, UE operations for different component carriers belonging to the same TAG may be first defined such that a backward compatibility can be applied. Accordingly, when transmitting an uplink channel (e.g., an uplink control channel and/or an uplink data channel) and an SRS under the same TAG, a power control or a dropping procedure for specific channel and/or signal may be performed. Furthermore, an uplink data channel transmission and an SRS transmission through component carriers belonging to different TAGs may be maximally guaranteed.

In addition, according to such operations defined for user equipment, in the case of carrier aggregation, degradation of data transmission rate in data channels may be prevented by avoiding an excessive power control for an uplink data channel. Furthermore, for SRS, a frequent dropping and/or an excessive power control according to satisfaction of specific conditions may be prevented, thereby ensuring a reliability of an SRS transmission in the case of carrier aggregation. Accordingly, a gain according to a frequency dependent scheduling and/or a beam-forming gain according to channel reciprocity in a time division duplex (TDD) may be obtained.

Returning to FIG. 11, at step S1140, user equipment 120 may multiplex an uplink channel (e.g., an uplink data channel and/or an uplink control channel) and an uplink reference signal (e.g., an SRS) to which the above-described uplink power control methods of user equipment are applied, and may transmit the multiplexed channel/signal to at least one of the first transmission/reception point 110 and the second transmission/reception point 112. In this case, in an uplink CoMP situation, user equipment 120 may transmit at least one of an uplink channel (e.g., an uplink data channel and/or an uplink control channel) and an uplink reference signal (e.g., SRS) to the first transmission/reception point 110, and transmit at least another of them to the second transmission/reception point 112.

Figure 12:
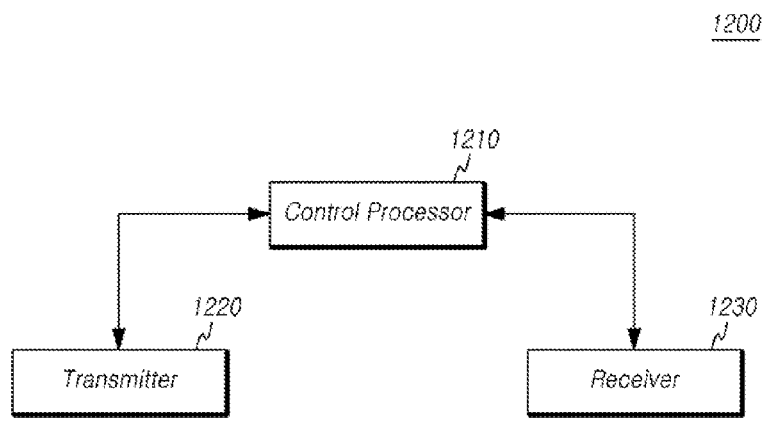
FIG. 12 is a diagram illustrating a transmission/reception point in accordance with some embodiments.

FIG. 12 is a diagram illustrating a transmission/reception point in accordance with some embodiments.

Referring to FIG. 12, transmission/reception 1200 according to at least one embodiment may include control processor 1210, transmitter 1220, and receiver 1230.

Control processor 1210 may control operations of transmission/reception point 1200, according to (i) transmission and multiplexing methods associated with control channels transmitted on uplink in user equipment under carrier aggregation, and/or (ii) a method of multiplexing an uplink control channel and an SRS.

Transmitter 1220 and receiver 1230 may respectively transmit and receive signals, messages, and/or data required for performing the above-described present embodiments, in connection with the user equipment. For example, transmitter 1220 may transmit configuration information associated with multiple TAGs (e.g., TAG configuration information) to the user equipment. Receiver 1230 may receive at least one of an uplink channel (e.g., an uplink data channel and/or an uplink control channel) and an uplink reference signal (e.g., an SRS) to which the above-described uplink power control methods of the user equipment are applied, from the user equipment.

Figure 13:
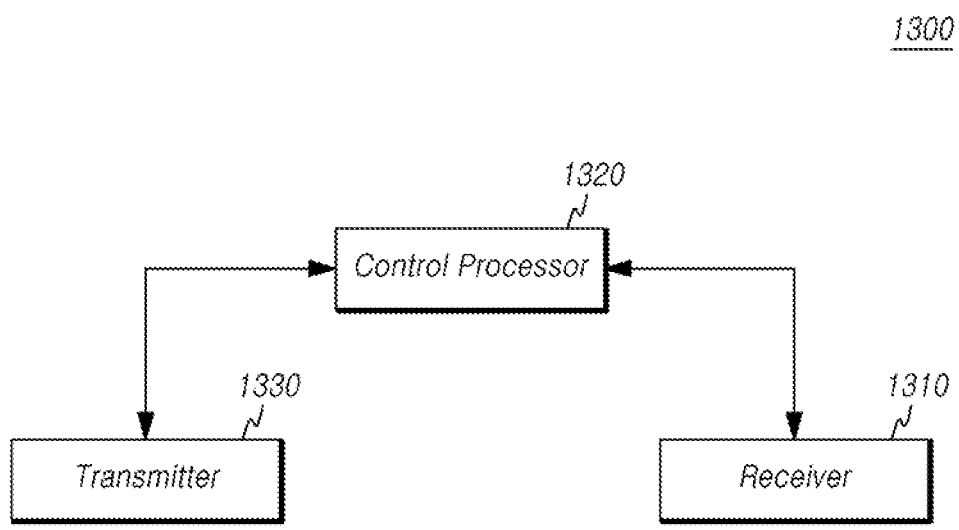
FIG. 13 is a diagram illustrating user equipment in accordance with some embodiments.

FIG. 13 is a diagram illustrating user equipment in accordance with some embodiments.

Referring to FIG. 13, user equipment 1300 according to at least one embodiment may include receiver 1310, control processor 1320, and transmitter 1330.

Receiver 1310 may receive downlink control information, data, and/or messages through a corresponding channel from a transmission/reception point. As described in Embodiment 1, receiver 1310 may receive configuration information associated with multiple TAGs (e.g., TAG configuration information) from the transmission/reception point.

In addition, control processor 1320 may control operations of user equipment 1300, according to transmission and multiplexing methods associated with control channels transmitted on uplink in user equipment 1300 under carrier aggregation, and/or a method of multiplexing an uplink control channel and an SRS.

As described in Embodiment 1, control processor 1320 may form the multiple TAGs, and perform a resource mapping for a simultaneous transmission of an SRS and a PUSCH on the same cell. Herein, the resource mapping may be performed such that the last symbol of a subframe transmitting the PUSCH is not mapped to a resource element for the PUSCH. Alternatively, as described in Embodiment 2, control processor 1320 may form the multiple TAGs, and control an SRS transmission in the case of a simultaneous transmission of an SRS and PUSCH/PUCCH (i.e., PUSCH and/or PUCCH) on different cells. Herein, the controlling may include dropping the SRS if a total transmit power exceeds a maximum allowable transmit power ($P_{CMAX}$) of user equipment 1300 on an overlapped portion between symbols transmitting the SRS and the PUSCH/PUCCH on the different cells. Alternatively, as described in Embodiment 3, in the case of a simultaneous transmission of an SRS (referred to herein as "a first SRS") and another SRS (referred to herein as "a second SRS") (i.e., in the case of a simultaneous transmission of SRS+SRS) on different cells, control processor 1320 may determine a transmit power of each SRS transmitted to each of the different cells by performing an identical scaling, if a total transmit power exceeds a maximum allowable transmit power of user equipment 1300 in an overlapped portion between symbols transmitting the first SRS and the second SRS.

Transmitter 1330 may transmit control information, data, and/or messages through a corresponding channel to a transmission/reception point.

In the above-described embodiments, in the case that user equipment is configured with multiple TAGs under carrier aggregation, and an uplink control/data channel(s) and an SRS are transmitted on different component carriers, operations of user equipment may be defined according to whether a transmit power limitation exists for the user equipment. Accordingly, an ambiguity associated uplink channel/signal transmissions of the user equipment according to a request of a transmission/reception point may be overcome.

Under carrier aggregation, the above-described embodiments may define operations of user equipment according to whether a transmit power limitation exists for the user equipment, in the case that (i) the user equipment is configured with multiple TAGs and (ii) an uplink channel (e.g., an uplink control channel and/or an uplink data channel) and an SRS are transmitted on different component carriers. Meanwhile, even under CoMP, in the case that (i) user equipment is configured with multiple TAGs and (ii) an uplink channel (e.g., an uplink control channel and/or an uplink data channel) and an SRS are transmitted on different component carriers, operations of the user equipment may be defined according to whether a transmit power limitation exists for the user equipment, as described above.

Although contents of technical standards referred to in the above-described embodiments are omitted for brief descriptions of the specification, the related contents of the technical standards may constitute a portion of the present specification. Accordingly, adding a portion of the standards-related content in the specification and/or the claims will be construed as being included in the scope of the present invention.

More specifically, the included documents may constitute a portion of the present specification as a portion of published documents. Accordingly, adding a portion of standards-related contents and/or standard documents in the description and/or the claims will be construed as being included in the scope of the present invention.

As described above, since the technical idea of the present invention is described by exemplary embodiments, various forms of substitutions, modifications and alterations may be made by those skilled in the art from the above description without departing from essential features of the present invention. Therefore, the embodiments disclosed in the present invention are intended to illustrate the technical idea of the present invention, and the scope of the present invention is not limited by the embodiment. The scope of the present invention shall be construed on the basis of the accompanying claims in such a manner that all of the technical ideas included within the scope equivalent to the claims belong to the present invention.

What is claimed is:

1. A method of controlling an uplink power in user equipment, the method comprising:
configuring multiple timing advance groups (TAGs) for sounding reference signals (SRSs) and uplink channels on different cells; and
controlling transmit power for the SRSs and the uplink channels, based on types of signals or channels to be simultaneously transmitted on the different cells,
wherein in a case of a simultaneous transmission of a plurality of SRSs on the different cells,
the controlling includes:

if a total transmit power of the plurality of SRSs exceeds a maximum allowable transmit power of the user equipment on an overlapped portion between symbols transmitting the plurality of SRSs, adjusting a transmit power of each SRS on each of the different cells by performing an identical scaling procedure using an identical scaling factor between the different cells such that the total transmit power does not exceed the maximum allowable transmit power of the user equipment, wherein in the identical scaling procedure, each SRS transmit power to be adjusted is multiplied by the identical scaling factor which is greater than '0' and is less than '1'; and wherein in a case of a simultaneous transmission of an SRS and at least one of a physical uplink shared channel (PUSCH) and a physical uplink control channel (PUCCH) on the different cells, the controlling includes:

dropping the SRS if a total transmit power of the SRS and the at least one of the PUSCH and the PUCCH exceeds a maximum allowable transmit power of the user equipment on an overlapped portion between symbols transmitting the SRS and symbols transmitting the at least one of the PUSCH and the PUCCH on the different cells belonging to different TAGs.

2. The method of claim 1, wherein the different cells are different component carriers.

3. The method of claim 2, wherein the number of the different component carriers is two or more.

4. The method of claim 1, wherein each of the plurality of SRSs is one of a periodic SRS and an aperiodic SRS.

5. The method of claim 1, wherein the overlapped portion is an entire portion or a partial portion in a subframe.

6. User equipment comprising:

a receiver configured to receive configuration information associated with multiple timing advance groups (TAGs) for sounding reference signals (SRSs) and uplink channels on different cells; and a control processor configured to control transmit power for the SRSs and the uplink channels, based on types of signals or channels to be simultaneously transmitted on the different cells, wherein in a case of a simultaneous transmission of a plurality of SRSs, the control processor is configured to:

if a total transmit power of the plurality of SRSs exceeds a maximum allowable transmit power of the user equipment on an overlapped portion between symbols transmitting the plurality of SRSs, adjust a transmit power of each SRS on each of the different cells by performing an identical scaling procedure using an identical scaling factor between the different cells such that the total transmit power does not exceed the maximum allowable transmit power of the user equipment, wherein in the identical scaling procedure, each SRS transmit power to be adjusted is multiplied by the identical scaling factor which is greater than '0' and is less than '1'; and wherein in a case of a simultaneous transmission of an SRS and at least one of a physical uplink shared channel (PUSCH) and a physical uplink control channel (PUCCH) on the different cells, the control processor is configured to drop the SRS if a total transmit power of the SRS and the at least one of the PUSCH and the PUCCH exceeds a maximum allowable transmit power of the user equipment on an overlapped portion between symbols transmitting the SRS and symbols transmitting the at least one of the PUSCH and the PUCCH on the different cells belonging to different TAGs.

7. The user equipment of claim 6, wherein the different cells are different component carriers.

8. The user equipment of claim 7, wherein the number of the different component carriers is two or more.

9. The user equipment of claim 6, wherein each of the plurality of SRSs is one of a periodic SRS and an aperiodic SRS.

10. The user equipment of claim 6, wherein the overlapped portion is an entire portion or a partial portion in a subframe.

\* \* \* \* \*